July 15, 1952 H. E. VAUGHAN 2,603,715

PULSE POSITION CALL OR DIAL RECEIVER

Filed June 29, 1948 5 Sheets-Sheet 1

INVENTOR
H. E. VAUGHAN
BY William F. Simpson.
ATTORNEY

July 15, 1952 H. E. VAUGHAN 2,603,715

PULSE POSITION CALL OR DIAL RECEIVER

Filed June 29, 1948 5 Sheets-Sheet 2

INVENTOR
H. E. VAUGHAN
BY William F. Simpson
ATTORNEY

PULSE POSITION CALL OR DIAL RECEIVER

Filed June 29, 1948 5 Sheets-Sheet 3

INVENTOR
H.E. VAUGHAN
BY William F. Simpson
ATTORNEY

INVENTOR
H.E. VAUGHAN
BY William F. Simpson
ATTORNEY

INVENTOR
H. E. VAUGHAN
BY William F. Simpson.
ATTORNEY

Patented July 15, 1952 2,603,715

UNITED STATES PATENT OFFICE 2,603,715

PULSE POSITION CALL OR DIAL RECEIVER

Henry E. Vaughan, Chatham, N. J., assignor to Bell Telephone Laboratories, Incorporated, New York, N. Y., a corporation of New York Application June 29, 1948, Serial No. 35,911

10 Claims. (Cl. 179—18)

Figures 1, 2, 7:
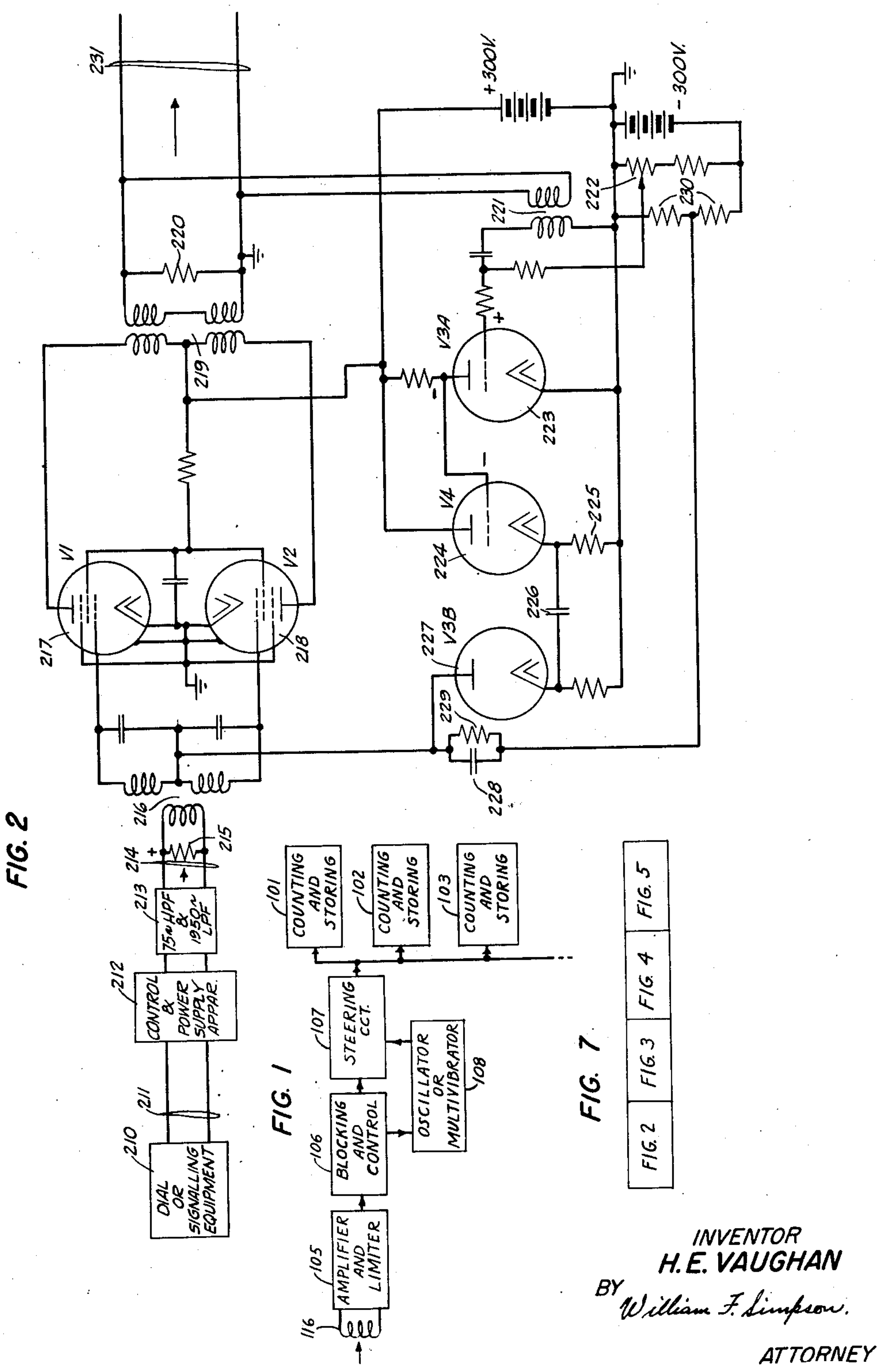

This invention relates to signal receivers and more particularly to telephone calling receivers of a type suitable for receiving pulse position calling or dial signals.

An object of the present invention is to provide a signal receiver capable of receiving signaling pulses arriving at a high rate which pulses have frequently components within the voice frequency signaling transmission range.

A further object of this invention is to provide an improved and reliable high speed pulse receiver which will recognize the times of arrival of various of the signaling pulses with reference to a reference time or reference pulse.

In accordance with an exemplary embodiment of the present invention, each digit or denominational order of a called subscriber's number or each symbol of a called station code is represented by two pulses, frequently called a start pulse and a stop pulse. The time elapsed in between the start pulse and the stop pulse is a function of the particular numeral or digit of the number or of the particular symbol of the code. It is, of course, appreciated that telephone subscribers' stations as well as telegraph subscribers' stations and other stations are frequently designated by a number or by means of some other symbol or groups of symbols.

A feature of the present invention relates to methods and circuits and equipment for recognizing symbols and codes by the time elapsing between the two pulses representing each number or symbol.

Another feature of the invention relates to methods, circuits and equipment responsive to pulses of sufficiently short duration to have a fundamental frequency and other frequency components lying within the frequency range of the usual voice frequency transmission range.

Another feature of this invention is directed to systems wherein the fundamental frequency of the pulses and the frequency band over which they are transmitted are related one to the other such that the fundamental pulse frequency is the mid-band frequency.

When pulses of short duration having frequency components lying within the voice frequency transmission path are applied to many such communication paths, they give rise to or cause transient currents to flow in path which transient currents are frequently of an alternating-current nature and of sufficient magnitude at the receiving end of the path to interfere with a succeeding pulse, if it should be received before the end of the transient.

A feature of the present invention relates to methods, circuits and equipment for recognizing only the first half cycle which exceeds a given reference or threshold value of one or the other polarities of each pulse and accompanying transient. Thereafter, in response to this pulse in the receiving equipment, it is rendered insensitive to the remainder of the transient and all other incoming currents. Blocking or reducing the sensitivity of the pulse receiving equipment at these times has the further advantage of rendering the system less affected by noise.

At the end of a predetermined time interval sufficiently great to allow the transient to be substantially fully dissipated, the receiving equipment is again rendered responsive to received pulses so that it will again respond to a succeeding pulse and thus enable a determination of the character, number, or symbol represented by the respective pulses.

A feature of the invention relates to a limiter or limiting amplifier having an automatic gain or volume control to which the received pulses are first applied. This amplifier is provided to extend the range of the communication lines and to render the amplitude of the received pulses substantially independent of the length of line over which the pulses have been transmitted. Such an arrangement eliminates the necessity for accurately controlling the gain or loss of the voice frequency channel; eliminates the necessity of varying the reference or threshold level above which the received pulses or currents must rise to be recognized for the different lines to which the receiver may be connected; eliminates special noise requirements and permits operation over different lines which each have satisfactory signal to noise ratios independently of the magnitude of the noise or signal levels on the various lines; and eliminates the necessity for preventing amplitude distortion within the channel or path.

Another feature of this invention relates to counting circuits for counting pulses to determine the number represented by the received pulses.

Another feature of this invention relates to control circuits for storing the information of the received pulses on the plurality of counting tubes until this information can be employed to establish connections or for other functions as desired.

Another feature of this invention relates to methods, apparatus and equipment for controlling the operation of a source of local pulses during the time between the reception of the above-identified start and stop pulses representing each digit.

Another feature of this invention relates to the use of gas-filled discharge tubes for counting and controlling various circuit functions at a high rate of speed.

Another feature of this invention relates to apparatus, methods and equipments for selecting one or more of the groups of pulses representing the various symbols, digits or denominational orders of the called subscriber's code or number. Further feature of this invention relates to equipment for repeatedly receiving such portions thereof as may be desired.

Another feature of this invention relates to translating the information represented by received pulses to information suitable for use in interconnecting telephone lines and systems.

The exemplary embodiment of this invention set forth herein has been designed to cooperate with and receive pulses transmitted from calling devices of the type disclosed in patent application of Parkinson, Serial No. 35,930, now Patent No. 2,597,898, filed on even date herewith, the disclosure of which application is hereby made a part of the present application as if fully included herein.

The exemplary embodiment of a signal receiver set forth herein incorporating the present invention has been designed to cooperate with the complete system disclosed in Malthaner, Serial No. 35,925, which is also filed on an even date herewith and the disclosure of which application is incorporated herein by reference to the same extent as if fully set forth herein.

Briefly, in accordance with the exemplary embodiment set forth herein, the circuits and equipment have been designed and arranged to cooperate with a transmission path having a frequency range of approximately 75 to 1950 cycles. This range is about the same or a little less than provided by most voice frequency communication paths. For this frequency range a fundamental pulse frequency of 1000 cycles was chosen. Inasmuch as no direct current can be transmitted over such a path the area under both the positive and negative portions of the pulse should be the same. These conditions are satisfactorily met by a pulse which approximates a single cycle of 1000-cycle current in which the pulse starts and ends tangent to the zero axis. These pulses are of sufficiently short duration so that they will pass over voice frequency signaling paths in a manner analogous to the manner in which voice frequency currents are transmitted over such paths. However, many types of voice frequency transmitting paths, apparatus and related equipment will have transients induced in them by such signaling pulses. These transients will have appreciable magnitude and persistence for appreciable intervals of time. It has been found that it will require on the order of 3.5 milliseconds for these transients to be dissipated sufficiently so that they will not interfere with a succeeding pulse.

Ample margins are provided for accurately determining the magnitude of each digit if the stop pulses occupy any one of ten different intervals of time which are of the order of 0.5 millisecond. In an exemplary embodiment these intervals of time are 0.444 millisecond long.

In accordance with the present invention the circuits are arranged so that they do not respond to any signaling currents received for seven pulse intervals after a pulse has been received, thus allowing ample time for the transients arising incident to the transmission of a signaling pulse to be dissipated. Accordingly, each digit or symbol will require approximately twenty-five increments or intervals of time of approximately 0.5 millisecond. That is, 1 millisecond, or approximately two increments of time for the start pulse, six additional increments of time making a total of eight intervals to allow transients appearing incident to the application of the start pulse to the system to be dissipated and then ten increments of time each designating one of the ten different digits and finally seven more increments. Since the stop pulse for zero will start in the last of the ten increments a total of at least approximately eight increments is provided during which the transients due to the stop or digit pulses are dissipated. Thereafter, the next and succeeding digits are transmitted by a series of two pulses occurring at differently spaced time intervals depending upon the magnitude of the digit in a manner similar to that described above.

When a start pulse is received, it causes an oscillator or multivibrator circuit to be set into operation. This pulse also causes various other circuits to function to steer the output of the oscillator to one of a group of counting and storing circuits. When the digit or stop pulse is received the operation of the oscillator or multivibrator is interrupted and the control circuits conditioned so that upon the reception of the next start pulse the output of the oscillator or multivibrator circuit will be applied to another counting and storing circuit. In this manner the magnitude of the digit or character of the symbol of the number or code of subscriber's station may be readily ascertained or stored at the central switching point ready for use in establishing connections through the system.

The exemplary system as set forth herein when operated in combination with pulses as described above has been found to operate satisfactorily over many transmission paths having a frequency transmission range of 400 to 1700 cycles.

Figure 4:
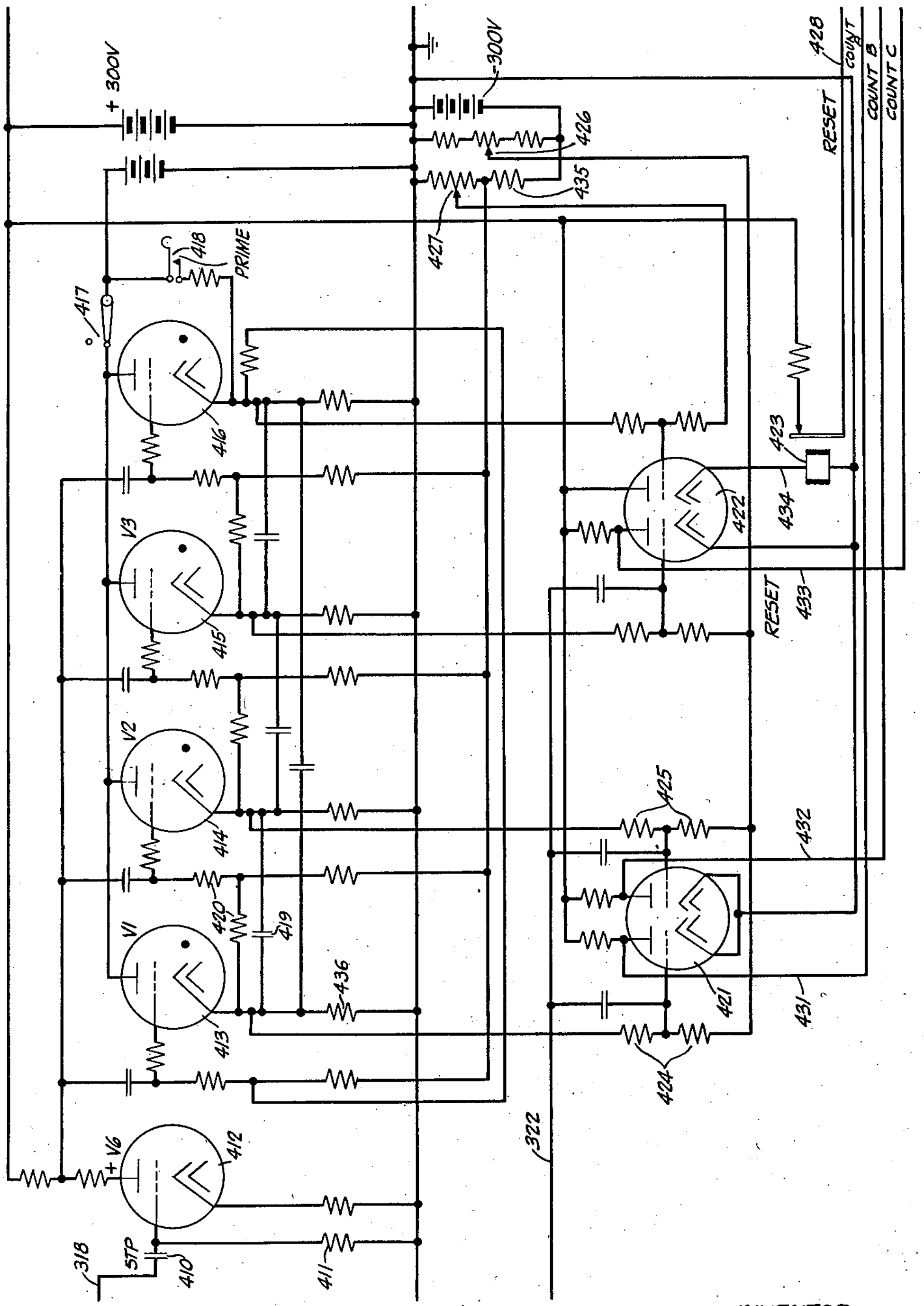
Figure 5:
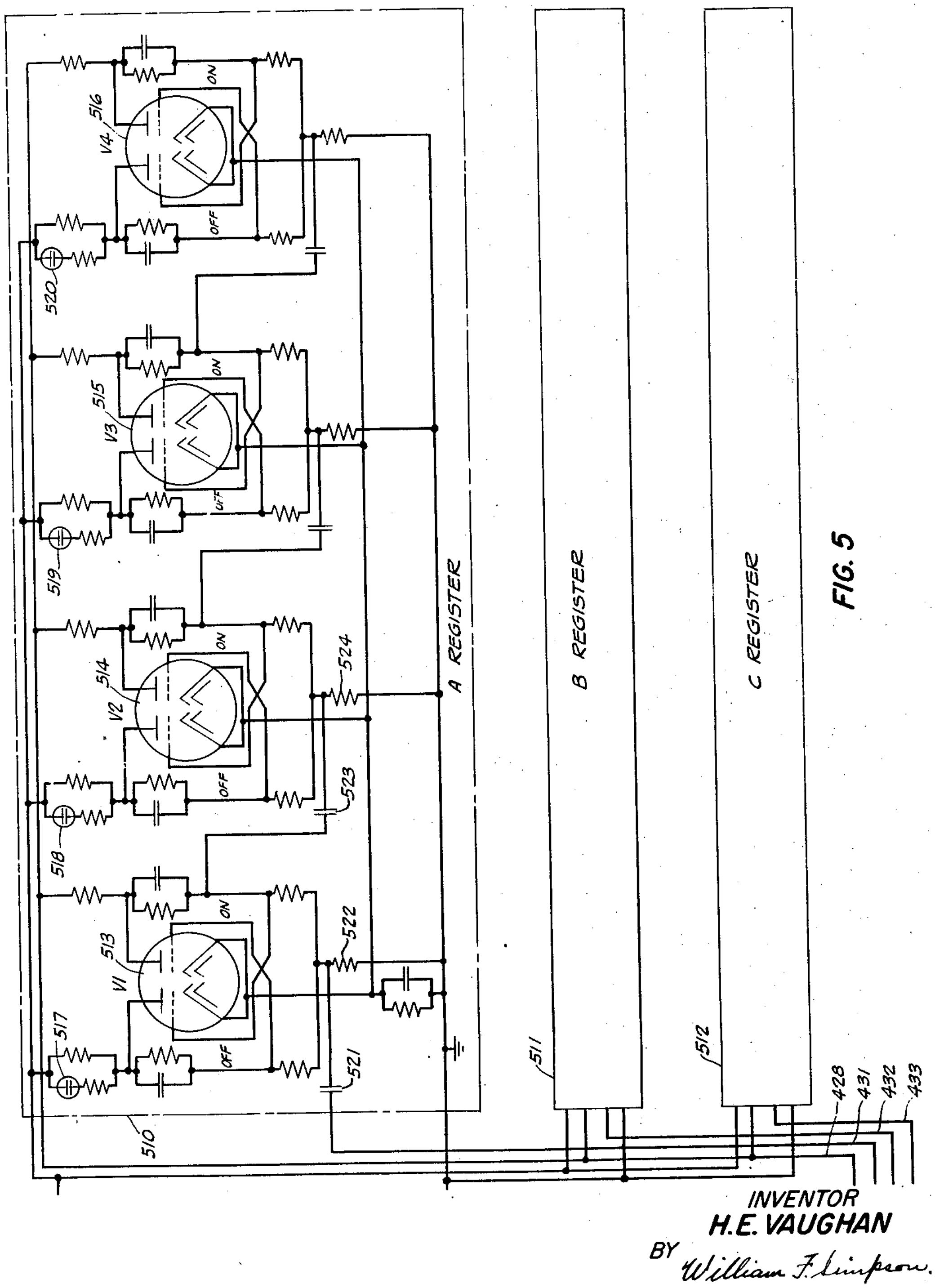
Figure 6:
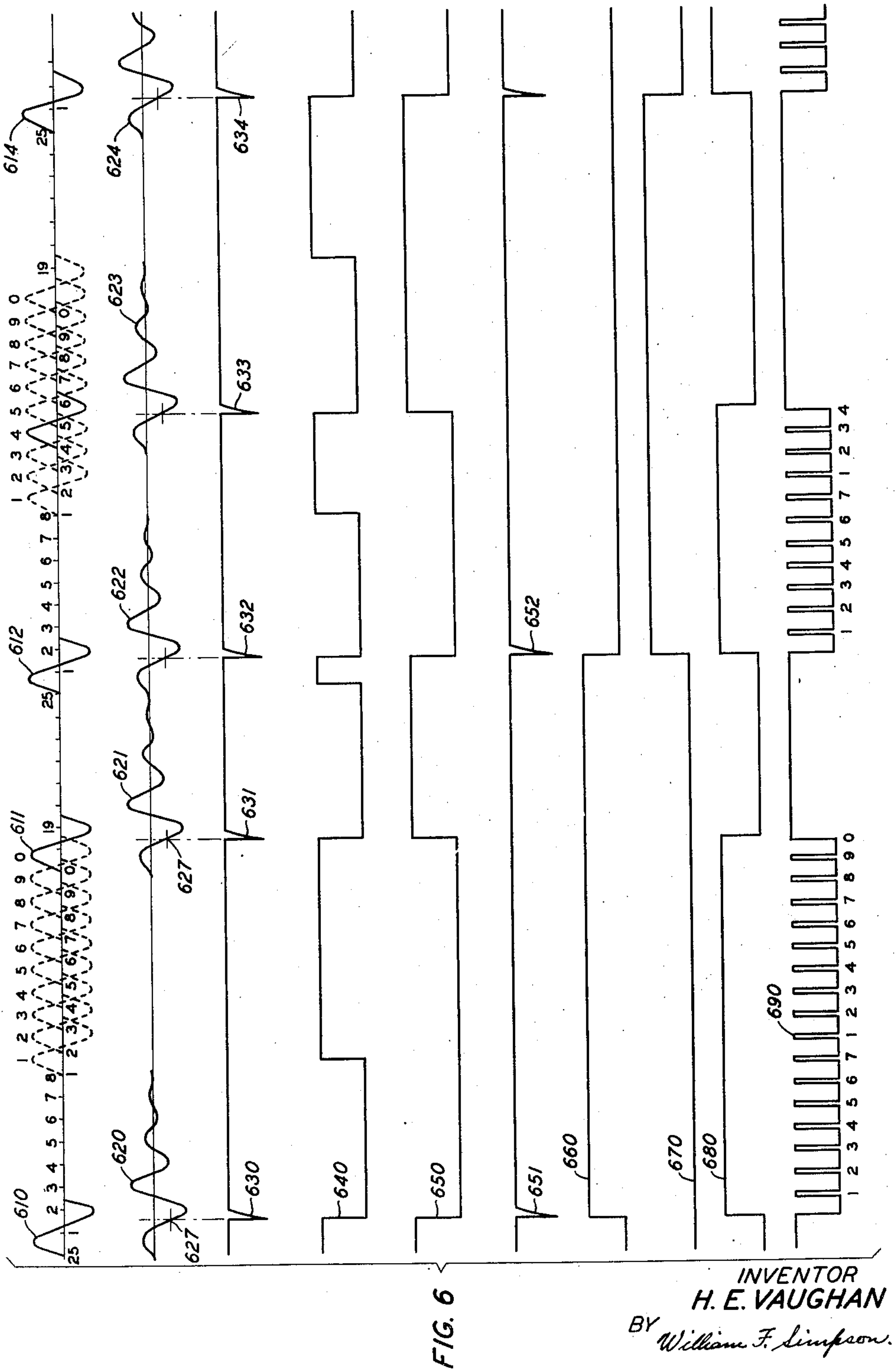

The foregoing objects and features of this invention, the novel features of which are specifically pointed out in the claims appended hereto, may be more readily understood by reference to the following specification when read with reference to the attached drawings in which:

Fig. 1 shows in outline form the various components of an exemplary signal receiver embodying the present invention;

Figs. 2 through 5, inclusive, show detailed circuits and the various elements shown in Fig. 1 and the manner in which they cooperate one with another;

Fig. 6 shows approximate wave forms of current or voltages at various points in the system; and Fig. 7 shows a manner in which Figs. 2 through 5 are located one adjacent another to form the exemplary system described in detail herein.

As illustrated in Fig. 1 the incoming signals are applied to a transformer having a secondary winding 116. These signals are then amplified and limited by the amplifier and limiter 105. From the amplifier and limiter 105 the received signals are then transmitted to the blocking and control circuit 106. Circuit 106 in response to each signal, blocks the signal path for a time interval required to dissipate the various transients set up by the application to the transmission system of the signaling pulses. Apparatus 106 also controls a steering circuit 107 and oscillator or multivibrator circuit 108. Each of the start pulses sets the oscillator and multivibrator circuit into operation so that its output is applied to the steering circuit 107 and from the steering circuit to one of the counting circuits 101 through 103, inclusive, as shown in Fig. 1.

It is to be understood that any suitable number of counting and storing circuits may be provided. Usually one of these circuits will be provided for each digit or character of the called subscriber's station code or number.

Each of the stop or digit pulses received will stop the operation of the oscillator or multivibrator circuit 108 due to the operation of the blocking and control circuit 106 and thus leave the counter and related storing circuits in the position as determined by the time of arrival of the stop pulse relative to the start pulse. That is, the longer time interval elapsing between the arrival of the start and stop pulses the longer multivibrator 108 will continue in operation and cause the counter circuits to count to higher numbers.

The start pulse also controls the steering circuits so that the output of the multivibrator or oscillator 108 will be applied to different counting and storing circuits for each of the digits of the called subscriber's number or other symbol of calling subscriber's station code.

Only three counting and storing circuits 101 to 103 are shown in Fig. 1 and also in Fig. 5. Likewise, only sufficient circuit and apparatus is shown for the steering circuit to direct the output of the oscillator 108 to three different counting and storing circuits.

It is to be understood, however, that as many counting and storing circuits and also as much equipment in the steering circuit will be provided as will be required by the designation of the called subscriber's station. If a called subscriber's number or station designation code requires eight digits at the switching office shown in detail herein and in Figs. 2, 3, 4 and 5 then eight counting and storing circuits will be provided as well as steering equipment to direct the pulses representing these digits of the storing and switching circuits.

Three digital counters 101, 102, and 103 are shown in the drawing. These are shown merely by way of example showing the position of the counting and storing circuits in the system and the manner in which the counting circuits cooperate with the other circuits and elements of an exemplary system. These counters represent any suitable or necessary number of counting circuits from one to a maximum number of digital positions in a complete subscriber's designation. When, as in the usual case, it is only necessary to use a portion of the digital positions of a subscriber's designation at any one switching center the counting circuits 101, 102 and 103 represent that portion which it is necessary or desirable to use at any one switching center. This portion may comprise the first one or more digital positions, one or more intermediate digital positions or one or more of the final digital positions of the subscriber's station designation. The counters as shown in the drawing may be employed to count and store pulses representing the magnitude of the digits in either consecutive or non-consecutive digital positions of the complete subscriber's designation.

If the called subscriber's station is designated by an eight-digit number or code but only three digits of this number are required at the central switching station shown in Figs. 2, 3, 4 and 5 to select a path to some other switching station or other circuit or path lead toward the called station then only three counting and storing circuits will be required at the switching station shown in Figs. 2, 3, 4 and 5 when arranged as shown in Fig. 7. A source or origin of signals is represented at 210 of Fig. 2. This source of signals may be calling or signal equipment and more specifically may be in accordance with the above-identified application of Parkinson or may be of any other type of pulse generating equipment capable of generating pulses in accordance with subscribers' numbers or station identifying codes as pointed out above. Line 211 represents the subscriber's line from the subscriber's premises to some central switching point and is shown terminated in a control and power supply circuit and apparatus 212.

Circuit 212 may supply the power to the subscriber's line in any suitable manner such as by means of the "simplex" circuit as shown in the above-identified application of Parkinson et al. This power is employed to operate the dial or calling equipment represented at 210. This power may be applied to the circuit and equipment during the calling or dial time and removed therefrom by any control circuits after the voice frequency transmission path has been completely set up to the called station. Alternatively, power for the dial or signaling equipment 210 may be supplied to an equipment locally at the subscriber's station in the manner similar to that set forth in the above-identified application of Malthaner Case 13.

As shown in Fig. 2 the incoming signals are transmitted from the control or power supply apparatus 212 through a filter or group of filters 213. This filter may comprise a high-pass filter for passing all frequencies above 75 cycles and a low-pass filter for passing all frequencies below 1950 cycles or it may be the band-pass filter for passing frequencies between these two limits. This filter network may also include any desired combinations of various types of filters that may be required to secure the desired frequency band which in the exemplary embodiment of this invention lies between 75 and 1950 cycles. This filter is employed to prevent interference between the low frequency currents which may be supplied over the subscriber's line to operate his dial or calling mechanism and the signaling pulses. This filter also prevents noise currents or voltages outside the pass band from interfering with the operation of the system and, in addition, causes some shaping of the received currents.

Where desired the control equipment 212 or the line from the filter networks 213 as illustrated in 214 may comprise any desired type of switching equipment necessary to connect the remainder of the system to the subscriber's line 211. In addition, the incoming line 214 may extend for a considerable distance and may include any desired type of voice frequency signaling equipment, that is, any equipment which will be responsive to voice frequency output from the filter network 213 and which is capable of delivering substantially similar frequencies to the terminals of line 214.

Line 214 is shown terminated in a resistance 215 to reduce reflections and also in transformer 216. The transformer 216 corresponds to transformer 116 as shown in Fig. 1.

In the exemplary embodiment of the invention set forth in detail herein double stability circuits are provided as well as chain or ring circuits employing gas-filled tubes. When power is first applied to the system it is desirable to set the various double stability circuits as well as the ring circuit in their proper position for the reception of signaling pulses. In order to accomplish these functions a number of switches have been provided. These switches may be operated by hand as shown in drawings or they may be operated by relays, which relays in turn may be operated by hand or automatically as illustrated by relay 423 which will be described hereinafter.

Figure 3:
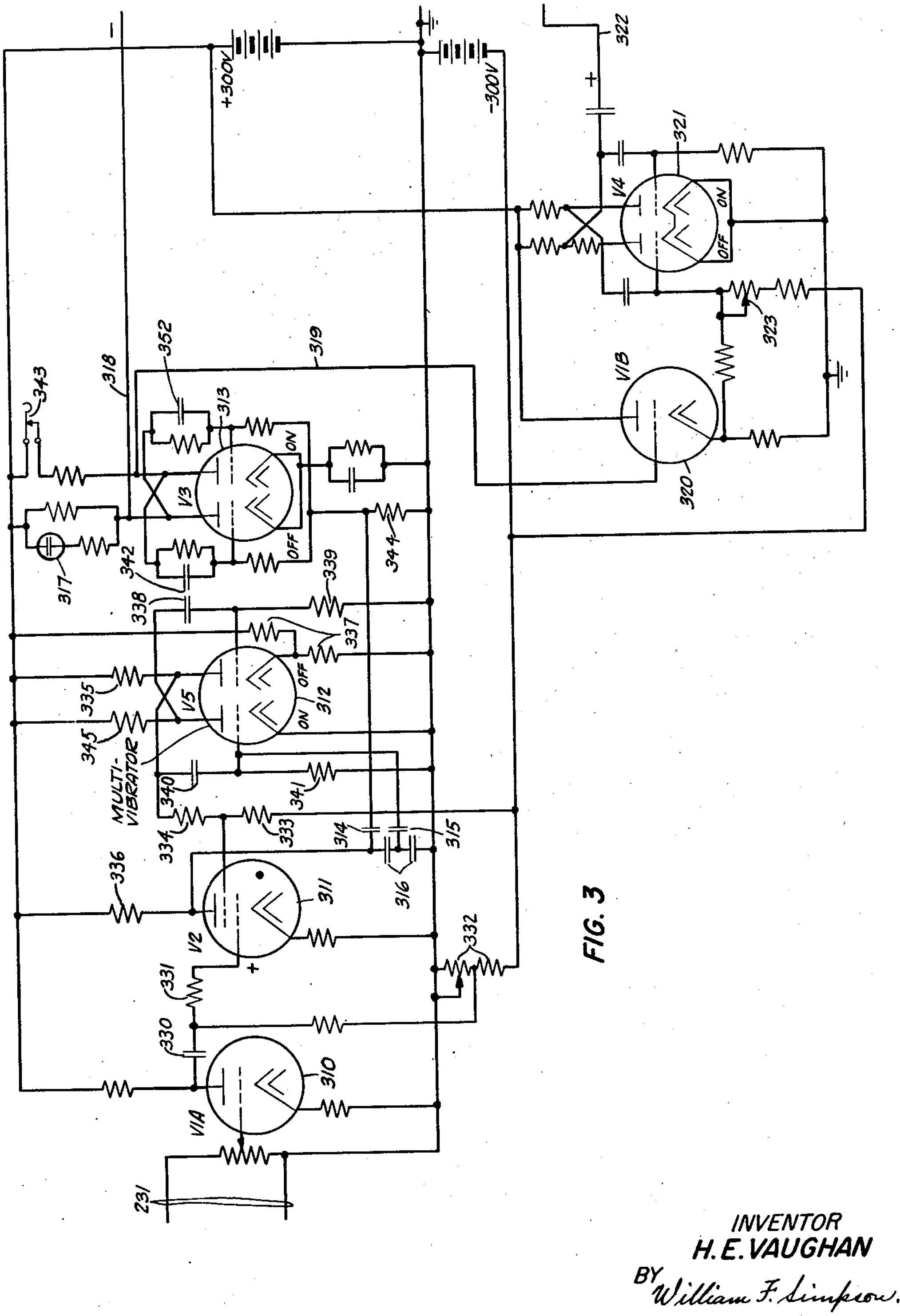

Tube 313 of Fig. 3 has both sections connected in a double stability circuit such that one or the other section is conducting current and the other section cut off. It is desirable to have the right-hand section normally conducting current when no signals are being received. However, when power is applied either section may initially start to conduct current. In order to set this tube to the proper condition key 343 is provided. In addition, lamp 317 is connected in the anode circuit of the left-hand section of tube 313. If the right-hand section of tube 313 is conducting and the left-hand section cut off light 317 will not light and indicate that the circuits of tube 317 are in their proper condition for receiving pulses. If, on the other hand, tube 317 lights upon the application of power to the system the operator or attendant will momentarily operate key 343 and interrupt connection from the left-hand grid to positive battery through the right-hand anode resistor and coupling resistors and thus interrupt the current flowing through the left-hand section of tube 313. When the current flowing through the left-hand section is interrupted light 317 will be extinguished. Then upon release of key 343 current will start to flow through the right-hand section of this tube whereupon the circuits are in a proper condition for the reception of signaling pulses.

Each of the registers shown in Fig. 5 comprises a plurality of counter stages for counting pulses as will be described hereinafter. In order that the pulses will be correctly counted, it is necessary that the tubes be restored to an initial condition before they are employed to count pulses. Here again, lamps 517, 518, 519 and 520 as well as similar lamps in the other similar registers 511 and 512 will light when the respective counter stages and tubes are set with the left-hand section conducting current and the right-hand section turned off or blocked. Under these circumstances each of the above enumerated lamps will be lighted. If these lamps are lighted relay 423 will be operated, or the circuit through its break contacts is interrupted by another key similar to key 343. The operation of this relay 423 in response to the operation of key 418 or to a discharge through tube 416 will cause the current flowing through the left-hand sections of any of the counter stages to be interrupted and thus cause current to flow through the right-hand sections of each of the stages when the relay or key is released which is the normal or initial condition of the circuit.

As shown in Fig. 4 a plurality of gas filled hot cathode discharge tubes 413, 414, 415 and 416 are arranged in a ring or distributor circuit. In order to properly direct the pulses of each of the respective digits to the proper registers, it is necessary that these tubes be properly conditioned to respond to the incoming signals as will be described hereinafter. In order to insure proper conditions of this circuit a main anode switch 417 and a priming switch 418 are provided. Upon the application of power to the system switch 417 is opened to insure that the discharge through any conducting tube, 413 to 416, inclusive, is interrupted. Thereupon, switch 417 is then reclosed and switch 418 is also closed. The closure of switch 418 applies a starting condition to tube 413 so that this tube will be the first one to start upon the application of pulses to it as will be described hereinafter, thus properly conditioning the circuits for the proper response to the first and succeeding dial pulses transmitted over this system.

In the exemplary embodiment of this invention shown in Fig. 2 transformer 216 is an input push-pull transformer for the push-pull amplifying tubes 217 and 218. The output of tubes 217 and 218 is coupled to the output transformer 219 and terminating resistance 220 which are connected to the line 231 extending to the blocking and control equipment shown in Fig. 3.

Tubes 223, 224, 227 are employed to control the gain of tubes 217 and 218 so that the output level of the push-pull tubes 217 and 218 is substantially independent of the amplitude of the input signals arriving over line 214 and applied to the primary winding of transformer 216.

When no signals are being received the bias applied to tubes 217 and 218 is such that the gain or amplification of these tubes is at its maximum value. This biasing potential is controlled by resistors 230 and condenser 228 and resistor 229. At this time tube 227 will be passing substantially no current and condenser 228 will be substantially fully discharged due to the action of resistor 229. Upon the application of signaling pulses to transformer 216 tubes 217 and 218 will cause an amplified pulse to be applied to line 231. This pulse is also applied to the primary winding of transformer 221 which causes a positive pulse to be applied to the grid of tube 223. Each succeeding signaling pulse likewise causes a positive pulse to be applied to the grid of tube 223. If the amplified pulse exceeds the value of the grid bias potential applied to grid 223 by means of potentiometer 222 current will flow in the anode-cathode circuit of tube 223 and thus lower the potential of the anode of this tube. Consequently a lower or more negative potential is applied to the grid of tube 224.

Tube 224 operates as a cathode follower tube so that its cathode is positive with respect to the center point of resistors 230 due to the current flowing through the output or cathode resistor 225. Upon the application of a negative pulse to the grid of tube 224 the cathode of this tube will have its potential or voltage with respect to ground, reduced. The cathode of tube 224 is coupled through a coupling condenser 226 to the cathode of the diode 227. As a result when the cathode of tube 224 has its potential reduced the cathode of the diode 227 will be made more negative and as a result current will flow through tube 227 thus reducing the potential of the upper terminal of condenser 228. As a consequence the bias potential applied to the control grids of tubes 217 and 218 is reduced, thus reducing the gain of these tubes.

Each succeeding pulse operates in the above manner to reduce the gain of tubes 217 and 218 until the equilibrium condition is obtained at which time the discharges or charges applied to the upper terminal of condenser 228 are substantially neutralized by the current flowing through resistor 229.

Normally it requires several pulses for the potential of condenser 228 to approach its steady state value where the succeeding pulse will maintain its value substantially constant and thus the gain of tubes 217 and 218 is also maintained substantially constant.

As a result, within the limits of operation of the system, the magnitude of the output signaling pulses applied to conductors 231 remains substantially constant and independent of the magnitude of the received signaling pulses applied to the primary winding of transformer 216.

Pulses applied to the conductors 231 through the output transformer 219 are applied to the grid of tube 310 in the usual manner through the potentiometer shown in Fig. 3.

Tube 310 is normally passing appreciable current in its anode-cathode circuit and each of the signal pulses applied to the grid of this tube are of a negative polarity so they cause the anode current to decrease. As a result the plate potential of tube 310 becomes more positive upon the application of each of the signaling pulses to the grid of this tube.

In the exemplary embodiment of this invention disclosed herein tube 311 is a gas-conduction tube provided with a cathode, an anode and two control electrodes. The first control electrode is biased by means of potentiometer 332 while the second control grid is connected to negative 300 volts supplied through the resistor 333 and to the anode of the right-hand section of tube 312. Normally the right-hand section of tube 312 is not conducting so that under these circumstances the second control electrode of tube 311 will be sufficiently positive due to the potentials derived from resistors 333, 334 and 335 to permit a discharge to be initiated in tube 311 at the time the first control electrode becomes sufficiently positive.

Upon the application of the first positive signaling pulse to the grid of tube 311 as described under the above-assumed conditions a discharge will be initiated through this tube causing the anode potential to be reduced from substantially the full plate supply potential to a very low value. The condenser network comprising condensers 316, 314 and 315, together with resistor 336, are so related that after a predetermined interval of time the discharge through tube 311 will be interrupted and the tube restored to its non-conducting condition.

The output or anode of tube 311 is also connected through coupling condensers 314 and 315 to the respective tubes 313 and 312. The two sections of tube 312 are arranged to form a single cycle multivibrator circuit. Thus the potentials applied to the elements of both sections of this tube are such that the left-hand section is normally conducting and the right-hand section non-conducting. The above conditions are obtained by applying positive potential to the cathode of the right-hand section through resistors 337 thus applying a relatively large negative bias between the cathode and grid of this section of tube 312. Consequently the left-hand section will continue to conduct current until interrupted by a signaling pulse.

As described above the first signaling pulse will be applied to the first grid of tube 311 and will initiate a discharge therethrough. The discharge current flowing through resistor 336 reduces the potential of the anode of tube 311 and thus the potential applied to the control grid of the left-hand section of tube 312. This negative pulse will interrupt the current flowing through the left-hand section of tube 312 and cause the left-hand anode to rise in potential. This potential rise is applied through the coupling condenser 338 to the grid of the right-hand section thus causing this section of tube 312 to become conducting when the left-hand section becomes non-conducting.

The above-described operation of the circuits may be more readily understood by reference to Fig. 6 which shows graphs of potential or current conditions at various places in the system. The top line shows the start pulses 610, 612 and 614 which are similar to a single cycle of a sine wave alternating current and represent the start pulse originating in the dialing or signaling apparatus 210. Each of these start pulses is followed by a stop pulse in any one of ten different positions which are shown less than a half cycle apart but may be spaced in time, by any suitable amount. The stop pulse 611 is assumed to be in the 10th or 0 position while the second stop pulse is shown in the No. 4 position. These pulses represent the pulses generated by the signaling equipment 210 and show the approximate wave form of the transmitted pulses. Due to the action of the transmission path, control equipment, filter networks and other transmission equipment, the pulses as received at the input of transformer 216 have a wave form similar to the graphs shown in the second line of Fig. 6. It is noted that for each pulse transmitted an oscillating transient of considerable duration is received at the receiving station. However, it should be noted that the transient is substantially dissipated before any succeeding pulse may be transmitted and received over the system. Thus the transient 620 is reduced to a very low value before the No. 1 pulse position. Likewise the transient 621 has been reduced to a very low value before the second start pulse 612 is transmitted and received. As shown in Fig. 6 no time interval between the transmission of the signaling pulses shown in the first line and the reception of the corresponding pulse in the second line is indicated. The transmission time of course will be present to a greater or lesser extent depending upon the length of the line and the transmission time thereover. However, this transmission time does not change the operation of the circuits and since in the usual case it will be a short duration there is no reason to further complicate the drawings to show this interval. While the wave form of the received pulses is similar to 620, 621, etc. of Fig. 6 these graphs represent the wave form as it appears at the output of the limiter or automatically regulated amplifier. The line 627 represents the magnitude of the received signal required to initiate a discharge through tube 311 in the manner described herein. Likewise pulse 630 shows the output pulse in the anode circuit of tube 311 in response to the first negative half cycle of the transient 620 as shown in Fig. 6. The pulse applied to the grid of the left-hand section of tube 312 is similar to pulse 630 except that it may be made of shorter duration if desired by making the coupling condenser 315 small and resistance 341 low, i. e. making the RC time constant of this circuit small.

The graph 640 shows the voltage of the anode of the right-hand section of tube 312. As indicated in the drawing upon the application of a negative output pulse from tube 311 the potential of the anode of the right-hand section of tube 312 falls to a relatively low value with the result that the voltage of the second control elements of tube 311 is no longer sufficiently positive to permit a discharge to be initiated through this tube upon the application of any of the succeeding positive half cycles of the transient 620 to the grid of this tube as long as the right-hand section of tube 312 is conducting.

At a later time interval depending upon the time constants of the condensers 338 and 340 and respective resistors 339, 341 and 345, the potential of the grid of the right-hand section of the tube 312 will become more negative and cause the current flowing through this section to be reduced or interrupted whereupon the grid of the left-hand section is made more positive so that current starts to flow in the left-hand section of this tube. The above-described action of tube 312 is well understood in the art and thereafter tube 312 due to the positive bias applied to the cathode of the right-hand section will remain in the above condition until another negative pulse is applied to the control grid of the left-hand section of tube 312. As illustrated in Fig. 6 of graph 640 the potential of the second control element of tube 311 will become again sufficiently positive to permit a discharge to be initiated through this tube when the right-hand section of tube 312 ceases to conduct current. As shown in Fig. 6 the circuits in the exemplary embodiment of the invention set forth herein in detail are designed so that the potential of the second control grid of tube 311 will not permit another discharge to be initiated through this tube for a time interval of approximately seven half-millisecond intervals, that is, 3.5 milliseconds. As pointed out above this time interval is required to allow the transient 620 to be dissipated sufficiently so that it will not interfere with the succeeding pulse.

The negative output pulse from tube 311 is also applied through the coupling and pulse shaping network comprising condenser 314 and resistor 344 to the control grids of both sections of tube 313. The sections of tube 313 are arranged to form a double stability circuit of the well-known type wherein either section will remain conducting and the other section non-conducting until the application of some signaling condition thereto. It is assumed herein that before the start pulse is received as described above, the right-hand section of tube 313 will be conducting and the left-hand section non-conducting.

Upon the application of a negative pulse to both grids of tube 313 the current flowing through the right-hand section will be interrupted and at the termination of the pulse current will start to flow in the left-hand section due to the stored energy and thus the potential of condenser 342 which will make the grid of the left-hand section more positive than the grid of the right-hand section.

Graph 650 in Fig. 6 shows the potential of the anode of the left-hand section of tube 313. Inasmuch as this tube becomes conducting upon the reception of a start pulse as described above, the potential of this anode falls at this time as illustrated by graph 650.

Graph 680 represents the potential of the right-hand section of tube 313. Inasmuch as the right-hand anode is normally conducting and ceases to conduct upon the reception of a start pulse the potential of the anode of the right-hand section rises at this time as illustrated in graph 680.

The anode of the right-hand section of tube 313 is coupled to the control grid of tube 320. Tube 320 is coupled to multivibrator tube 321 or any other suitable type of oscillator which may be started into operation and stopped as desired under control of another tube such as tube 320. The two sections of tube 321 are connected to form a multivibrator of the type shown in which the grid of each section is coupled through a condenser to the plate or anode of the other section. However, the grid of the left-hand section is normally biased by means of potentiometer 323 sufficiently negative so that this section is normally non-conducting and the right-hand section conducting.

Tube 320 operates as a cathode follower tube and inasmuch as the hight-hand section of tube 313 is normally conducting this anode and thus the control grid of tube 320 will be at a relatively low potential. Consequently the cathode of tube 320 will also be at a very low voltage with the result that the bias of the left-hand section of tube 321 is sufficiently negative as described above to maintain the left-hand section of this tube non-conducting. However, upon the application of a start pulse to the input transformer 216 the right-hand section of tube 313 becomes non-conducting and thus the anode of the right-hand section of tube 313 and the grid of tube 320 rises to a relatively high positive voltage. Consequently the cathode of tube 320 also rises to a relatively high positive voltage which in turn reduces the bias on the left-hand section of tube 321 so that thereafter tube 321 will operate as a normal multivibrator at a frequency controlled by the time constants of the various resistors and coupling condensers.

This time constant has been adjusted so that the multivibrator comprising tube 321 makes one complete cycle for each increment of time assigned to a pulse, that is, for each 0.444 millisecond in the exemplary embodiment described herein. The operation of the multivibrator 321 is shown by graph 690 of Fig. 6. Thereafter the circuits remain in the condition described until a stop pulse is received. As pointed out above the tube 312 is restored to its normal condition before any of the stop pulses may be received because they are transmitted after a sufficient interval after the start pulse to allow any transient due to the start pulse to become dissipated.

As soon as both sections of tube 312 have restored to their normal conditions tube 311 is conditioned to respond to the following stop pulse. As illustrated by graph 640 tube 312 is restored to its initial condition prior to the time the stop pulse in the No. 1 position will be transmitted. As illustrated in Fig. 6, however, the stop pulse is not received until the 10th or 0 position at which time a discharge is again initiated through tube 311 in the manner described above. As a result the negative output pulse 631 is again applied to the control grid left-hand section of tube 312 at which time the right-hand section of this tube again reduces the potential of the second grid of tube 311 so that another discharge will not be initiated through this tube until the transient 621 due to the stop pulse 611 has been dissipated. In addition the stop pulse is also applied to the control grids of both sections of tube 313 which is restored to its initial condition as illustrated by graph 680 at which time the cathode of tube 320 is returned to a low voltage thus interrupting the operation of the multivibrator tube 321. As illustrated in graph 690 under the above-described conditions the multivibrator tube 621 will make seventeen complete oscillations during this time interval between the start and stop pulses, that is, seven oscillations during the start pulse time and the resultant transient during which time tube 312 blocks tube 311 and ten oscillations during the pulse interval time thus indicating that the 10th or the 0 digit was represented by the stop pulse received at this time.

As described above the left-hand section of tube 313 is normally non-conducting until a start signal is received in a manner described above. Consequently, lead 318 will be at a relatively high positive potential. Upon the reception of a start pulse tube 311 is rendered conducting which in turn causes the negative pulses to be applied to the grids of both sections of tube 313 as described above. This pulse is made relatively short or in effect, differentiated by the coupling condenser 314 and resistor 344 as described hereinbefore. Upon the termination of this short pulse as applied to the grids of both sections of tube 313 and illustrated by pulse 630 of Fig. 6, the left-hand or off-section of tube 313 will start to conduct and the right-hand section cease to conduct current in the output of the anode circuit. Consequently, the potential of the anode left-hand section falls to a relatively low value as illustrated by graph 650 of Fig. 6.

The anode of the left-hand section of tube 313 is connected by conductor 318 and coupling condenser 410 to the grid of tube 412. The condenser 410 as well as resistance 411 are such that they in effect differentiate the potentials of the anode of the left-hand section of tube 313 and at the time of question cause a negative pulse to be applied to the grid of tube 412. This pulse is of short duration as illustrated by pulse 651 in Fig. 6.

Tube 412 is normally conducting appreciable current so that the application of a negative pulse to its grid interrupts or reduces this current with the result that a positive potential pulse appears in the output circuit of tube 412.

The positive output pulse from the anode of tube 412 is applied through suitable coupling condensers to the grids of each of the gas-filled tubes 413, 414, 415 and 416. The coupling condensers together with the bias resistors are such that pulses of relatively short duration are applied to the control grids of these tubes. The biases of the control grids of these tubes due to the resistors 427 and 435 is such that the pulses applied to the control grids of these tubes from the anode circuit of tube 412 is normally insufficient to initiate a discharge through any of these tubes. However, with either the priming key 418 closed or another tube such as 416 conducting a higher grid bias is applied to the control grid of tube 413. With this higher bias potential the magnitude of the pulse received from tube 412 is sufficient to initiate a discharge in tube 413.

Upon the initiation of the discharge through tube 413 current will flow through its cathode resistor 436 and cause the cathode of tube 413 to rise to a relatively high potential. This potential is coupled through coupling resistors 420 to the control grid of tube 414. This potential does not cause a discharge to be initiated through tube 414 at this time because the pulse from tube 412 through the coupling condenser of tube 414 is substantially over at this time. The coupling resistors 420, however, serve to raise the bias of tube 414 so that upon the next application of a pulse from the anode circuit of tube 412 a discharge will be initiated through tube 414 as will be described hereinafter.

Tubes 421 and 422 are normally biased so they do not conduct current or operate as amplifier tubes due to potentiometer 426. However, upon the initiation of a discharge through tube 413 at which time the potential of its cathode rises to a high positive value as described above, the bias on the left-hand section of tube 421 is raised so that this tube will operate an an amplifier tube and repeat the pulses from the multivibrator 221 received over conductor 322. These pulses are illustrated by graph 690 in Fig. 6. Tube 421 operates to repeat these pulses over lead 431 which extends to counter A designated 510 in Fig. 5. Pulses are applied over lead 431 through the coupling condenser 521 to both grids of the counter stage comprising tube 513. The coupling condenser 521 and related resistor 522 have such values that they serve to differentiate the output pulses from the multivibrator 321 and thus effectively shape the pulses so that they will properly control the counter stage 513. Thus, the first pulse or a negative portion thereof will cause the conducting right-hand section to cease conducting current and at the termination of the first pulse of tube 513, the left-hand section will start to conduct. This will cause the indicating lamp 517 to light and thus register one pulse. Upon the interruption of the current through the right-hand section of tube 513 the anode of this tube will become more positive and apply positive a pulse through the coupling condenser 523 to both grids of the second stage 514. This positive pulse, however, does not cause any change in the conducting conditions of either section of tube 514 because this pulse is positive.

Upon the application of the second pulse from the multivibrator through the coupling condenser 521, the conducting left-hand section of tube 513 will become non-conducting and extinguish lamp 517. At the termination of this pulse the right-hand section will again become conducting. At this time, its anode will change from a high positive value to a much lower voltage. This voltage change is transmitted through the coupling condenser 523 and resistor 524 which serve to shape or differentiate the pulse and in effect produce a negative pulse of short duration which is applied to the grids of both sections of tube 514. In response to this pulse the conducting left-hand section of tube 514 will be turned off and the right-hand section will start to conduct current and cause lamp 518 to light thus registering the second pulse. The third pulse will again cause lamp 517 to light while the fourth pulse will extinguish both lamps 517 and 518 and cause lamp 519 to operate in a manner similar to that described above. Each of the succeeding pulses thereafter are counted and registered on the lamps in a manner similar to that described above with respect to the first, second and third pulses.

It should be noted that under the conditions assumed wherein the first digit is a 0, 17 pulses in all are transmitted to and stored in a counting circuit. It is further noted that the counter is arranged to count only to 16. Upon the 16th pulse the counter is restored to its initial condition and thereafter will count the next two pulses received. Thus for the symbol 0, lamp 517 will be lighted; for the symbol 9, none of the lamps will be lighted; for the symbol 8, all four lamps 517, 518, 519 and 520 will be lighted, etc. Inasmuch as it is only necessary to record 10 different digits, the four counter stages shown in Fig. 5 provide ample capacity and will properly indicate each one of the 10 different digits which may be dialed by the subscriber's equipment.

When the stop pulse is received which under the assumed condition will be in the 10th or 0 position, it causes tube 311 to fire as described above and to transmit a pulse of short duration through coupling condenser 314 to resistor 344 and to the grids of both sections of tube 313. The left-hand section which was conducting ceases to conduct and after the completion of the pulse the right-hand section starts to conduct. In starting to conduct the right-hand section interrupts the operation of the multivibrator 321 as described above. The left-hand section of tube 313 in ceasing to conduct current causes a positive potential or positive pulse to be applied to the grid of tube 412 through the coupling condenser 410. This pulse, however, does not produce any useful result at this time because tube 413 cannot have its discharge interrupted by a negative pulse, which tube continues to conduct current as described above. In addition the potentials applied to the elements of tube 412 are such that this tube will not amplify or satisfactorily repeat this pulse.

Upon reception of the next start pulse such as 612, tube 313 again conducts and applies a short pulse to both control elements of tube 313 thus again causing the left-hand section to conduct current and interrupting current to the right-hand section. The right-hand section in ceasing to conduct current sets the multivibrator 321 into operation as described above. The left-hand section in conducting current at this time applies a negative pulse of short duration through the coupling condenser 410 to resistor 411 and to the grid of tube 412. At this time tube 413 is conducting so that its cathode will be at a relatively high positive voltage. Resistor 420 causes the grid of tube 414 to be likewise at a more positive potential than the potential at the mid-point of resistor 435 and potentiometer 427. As a result the positive pulse due to the second start pulse from tube 412 as applied to the control elements of all of the tubes 413, 414, 415 and 416 will be of sufficient magnitude to initiate a discharge through tube 414.

When tube 414 starts to conduct its cathode will rise to a relatively high positive voltage and due to the commutating or coupling condenser 419 will cause the cathode of tube 413 to be raised to a high positive potential for an interval of time sufficiently long to interrupt the discharge through tube 413.

If prior to the initiation of the discharge through tube 414 it is assumed that the anodes of tubes 431 to 416, inclusive, are maintained at a potential of 120 volts above ground and during the time tube 413 is conducting, it is further assumed that its cathode will be at approximately 100 volts positive above ground. Then, with tube 413 conducting and tube 414 nonconducting condenser 419 will become charged to approximately 100 volts, that is, the left-hand terminal will be 100 volts more positive than the right-hand terminal. Then upon the initiation of a discharge through tube 414, its cathode will rise to approximately 100 volts. This means that the cathode of tube 413 will then rise to 100 volts plus a 100-volt charge on condenser 419 or approximately 200 volts. This is above the potential of the anode so that the anode-cathode potential of tube 413 is approximately minus 80 volts thus extinguishing tube 413.

The interruption of the discharge through tube 413 permits its cathode to return to substantial ground potential after condenser 419 has been discharged. As a result the left-hand section of tube 421 is cut off so that this tube ceases to operate as an amplifier and will repeat no further pulses over lead 431 to the "A" register 510.

The initiation of a discharge through tube 414, however, causes the potential of its cathode to rise to a relatively high positive potential which potential causes the right-hand section of tube 421 to operate as an amplifier tube and repeat the pulses from the multivibrator 321 over lead 432 to register "B" designated 511 in Fig. 5. Thereafter the circuits of the system operate in substantially the same manner as described above and register 511 will record the magnitude of the second digit representing the number of the called subscriber station.

In a similar manner the next start pulse will initiate a discharge through tube 415 which in turn interrupts the discharge through tube 414. As a result the succeeding pulses from the multibrator tube 321 will be directed and registered by the "C" register designated 512 in Fig. 5.

The magnitude of this digit will thereupon be registered "C" in a manner similar to that described above. If it is desired to determine the magnitude of each of the digits in eight digital positions then eight tubes similar to tubes 413 through 415, inclusive, will be provided and connected in a chain circuit comprising tubes 413 through 415. In addition four more sections of tubes similar to sections of tubes 421 and 422 will also be provided for repeating the pulses representing the respective digits to the proper counting circuits such as 510, 511, 512 and so forth. It will also be understood that in case it is necessary to determine the magnitude of eight digits, for example, eight counting circuits similar to 510, 511, and 512 will be provided.

As shown in the drawing, the three counting circuits 510, 511, and 512 are employed to record the magnitude of the digits in the first three digital positions of a complete subscriber's designation. It is obvious that one such counter will be necessary for each digital magnitude of which is necessary to determine. Thus, if it is necessary to determine the magnitude of the first four digits, an additional counter will be employed and connected to the steering circuit in the next position after the position controlled by tube 415.

When it is necessary to determine the magnitude of only a portion of the final digits of the subscriber's designation then the counters connected to the first stages of the steering circuits such as 413, 414 and so forth may be omitted and counters provided for and connected to the tubes associated with the final digits of the complete subscriber's designation. In case it is desired to determine the magnitude of certain of the intermediate digits of the subscriber's number counters will be associated with the steering circuit tubes rendered active at the time pulses representing these intermediate digits are received. In this case counters associated with the first stages may be likewise omitted and the counting and steering stages associated with the final digits may also be omitted. Under the assumed conditions the fourth start pulse will initiate a discharge through tube 416 which in turn interrupts the discharge through tube 415. The initiation of a discharge through tube 416 will cause relay 423, connected to the cathode of the right-hand section of tube 422 over lead 434, to operate. The operation of this relay interrupts the potential to the right-hand sections of all of the counter stages of registers "A", "B" and "C". As a result the storage capacity connected to these anodes becomes discharged and the grids of the left-hand sections of each stage become grounded thus substantially interrupting the flow of current through the left-hand stages of all the counters. The storage condenser associated with the anode of the left-hand stages, however, becomes substantially fully charged due to the fact that substantially no anode current flows in the anode resistance of this section. As a result the grid of the right-hand section becomes more positive than the grid of the left-hand section so that when relay 423 is released in response to the reception of the fifth start pulse in a manner described above, a discharge will be initiated through tube 413, which discharge causes the interruption of discharge through tube 416 in a manner similar to that described above.

Thereafter the operation of the circuits continues substantially as described above.

It is to be understood that the magnitude or value of each digit or symbol recorded in each of three registers may be readily determined by observing lamps 517, 518, 519 and 520 associated with each of these stages in each register as indicated above. It is also apparent that every fourth digit is directed to register "A" and the succeeding fourth digit to register "B" and the next to register "C", while the fourth digit of the series is not employed to control any register. It is apparent that one stage in the steering circuit should be provided for each digit in the number and that a repeating tube or section similar to tubes 421 and 422 must be provided for each digit of the number which it is desired to decode or employ at the switching point.

What is claimed is:

1. In a telephone system, call receiving and recording apparatus comprising a repeating circuit, pulse detecting elements included in said repeating circuit, elements for repeating said pulses included in said repeating circuit, blocking means operative incident to repeating a received pulse for blocking said repeating circuit, means interconnecting said repeating circuit and said blocking means, time delay means for controlling said blocking means for a predetermined interval of time, interconnections between said time delay means and said blocking means, an oscillator, other pulse detecting apparatus responsive to one of said repeated pulses, interconnections between said oscillator and said other pulse detecting apparatus, means for initiating the operation of said oscillator under control of said other pulse detecting apparatus, and apparatus interconnected with said oscillator and to said other pulse detecting apparatus responsive to the next of said repeated pulses for stopping the operation of said oscillator.

2. In a telephone system, call receiving and recording apparatus comprising a repeating circuit, pulse detecting elements included in said repeating circuit responsive to received pulses, other elements included in said repeating circuit for repeating detected pulses, blocking means operative incident to repeating one of said pulses for blocking said repeating apparatus for succeeding pulses, time delay means for controlling said blocking means for a predetermined interval of time, interconnecting means interconnecting said repeating circuit, said blocking means and said time delay means, an oscillator circuit, an oscillator control circuit including means responsive to one of said repeated pulses for initiating the operation of said oscillator circuit, controlling apparatus also included in said control circuit responsive to the next succeeding of said repeated pulses for stopping the operation of said oscillator circuit, interconnections between said control circuit and said oscillator circuit and said repeating circuit, apparatus for counting the cycles of oscillation of said oscillator between said respective start and stop pulses and means for conveying said cycles of oscillation from said oscillator circuit to said apparatus for counting said cycles.

3. In a telephone system, call receiving and recording apparatus comprising pulse repeating apparatus, pulse detecting elements connected in said pulse repeating apparatus, pulse repeating elements also connected in said pulse repeating apparatus, apparatus for initiating the operation of said repeating apparatus in response to a received pulse, blocking apparatus for blocking the further operation of said pulse repeating apparatus, interconnections between said pulse repeating apparatus and said blocking apparatus and said apparatus for initiating the operation of said repeating apparatus, time delay means for holding said blocking apparatus effective for a predetermined interval of time, a source of cyclic current, means for utilizing said cyclic current interconnected with said source, control apparatus for supplying current from said source to said means for utilizing said cyclic currents and operative incident to the repeating of a pulse, interconnections between said control apparatus and said repeating apparatus and with said source, and other control means operative incident to the reception of a succeeding pulse for interrupting the supply of said cyclic current to said means, and means for interconnecting said other control means to said receiving apparatus and said source of cyclic current.

4. In a telephone system, call receiving and recording apparatus comprising pulse repeating apparatus including pulse detecting elements and pulse repeating elements, means for initiating the operation of said repeating apparatus in response to a received pulse, apparatus interconnected with said repeating apparatus for blocking the further operation of said pulse repeating apparatus, time delay means for maintaining said blocking apparatus effective for a predetermined interval of time, apparatus for generating cyclic current, means operating incident to the reception of a pulse interconnected with said apparatus for generating cyclic current for initiating the operation of said apparatus for generating cyclic current, means operative incident to the reception of a succeeding pulse interconnected with said apparatus for generating cyclic current for interrupting the operation of the said apparatus for generating cyclic current, a plurality of storage means and apparatus responsive to said pulses interconnected with said repeating apparatus and with said apparatus for generating cyclic current and with said storage means for directing successive series of cyclic currents from said source to said storage means in succession.

5. A telephone system call receiver comprising apparatus for receiving significant characteristics of repeatedly transmitted series of pulses, apparatus interconnected with said apparatus for receiving pulses for selecting a predetermined portion of a series of said pulses, a plurality of registers for recording the significant characteristics of said selected portions of said pulses, and a steering circuit interconnected with said apparatus for receiving pulses and with said registers for directing the selected portion of each series of pulses to respective ones of said register circuits.

6. A telephone call receiver comprising apparatus for receiving significant characteristics of repeatedly transmitted series of pulses, selecting apparatus interconnected with said apparatus for receiving pulses for selecting a first portion of a series of said pulses, a plurality of register circuits for recording the significant characteristics of the selected pulses, and a steering circuit interconnected with said apparatus for receiving pulses and with said register circuits for directing the selected pulses to respective ones of said register circuits.

7. A telephone call receiver comprising apparatus for receiving significant characteristics of repeatedly transmitted series of pulses, selecting apparatus interconnected with said apparatus for receiving pulses for selecting intermediate groups of pulses of a series of said pulses, a plurality of register circuits for recording the significant characteristics of the selected groups of pulses, and a steering circuit interconnected with said apparatus for receiving pulses and with said register circuits for directing the selected pulses to respective ones of said register circuits.

8. A telephone call receiver comprising apparatus for receiving significant characteristics of repeatedly transmitted series of pulses, selecting apparatus interconnected with said apparatus for receiving pulses for selecting a final portion of a series of said pulses, a plurality of register circuits for recording the significant characteristics of the selected pulses, and a steering circuit interconnected with said apparatus for receiving pulses and with said register circuits for directing the selected pulses to respective ones of said register circuits.

9. In a pulse controlled telephone switching system in combination, call receiving apparatus comprising a repeating circuit responsive to received pulses for repeating received pulses, a single cycle multivibrator circuit having one stable condition to which the circuit automatically returns and a condition of temporary stability, means including interconnections between said repeating circuit and said single cycle multivibrator circuit for setting said single cycle multivibrator circuit in its condition of temporary stability in response to each pulse repeated by said repeating circuit, means including other interconnections between said circuits for preventing the operation of said repeating circuit during the time said single cycle multivibrator circuit is in its condition of temporary stability.

10. In a pulse controlled telephone switching system in combination, call receiving apparatus comprising a repeating circuit responsive to received pulses for repeating received pulses, a single cycle multivibrator circuit having one stable condition to which the circuit automatically returns and a condition of temporary stability, apparatus including interconnections between said repeating circuit and said single cycle multivibrator circuit for setting said single cycle multivibrator circuit in its condition of temporary stability in response to each pulse repeated by said repeating circuit, means including other interconnections between said circuits for preventing the operation of said repeating circuit during the time said single cycle multivibrator circuit is in its condition of temporary stability, a free-running multivibrator circuit, interconnecting means interconnected between said repeating circuit and said free-running multivibrator circuit for initiating operation of said free-running multivibrator circuit in response to a pulse repeated by said repeating circuit, and means interconnected with said free-running multivibrator responsive to a succeeding pulse for interrupting the operation of said free-running multivibrator circuit.

HENRY E. VAUGHAN.

REFERENCES CITED

The following references are of record in the file of this patent:

UNITED STATES PATENTS

| Number | Name | Date |
|---|---|---|
| 1,900,969 | Wright | Mar. 14, 1933 |
| 2,006,354 | Hovland | July 2, 1935 |
| 2,074,037 | Watson | Mar. 16, 1937 |
| 2,141,372 | Baumfalk | Dec. 27, 1938 |
| 2,153,202 | Nichols | Apr. 4, 1939 |
| 2,222,131 | Willis | Nov. 19, 1940 |
| 2,262,838 | Deloraine et al. | Nov. 18, 1941 |
| 2,257,568 | Mathes | Sept. 30, 1941 |
| 2,272,070 | Reeves | Feb. 3, 1942 |
| 2,329,022 | Willis | Sept. 7, 1943 |
| 2,341,746 | Taylor et al. | Feb. 15, 1944 |
| 2,351,446 | Myers | June 13, 1944 |
| 2,360,296 | Willis | Oct. 10, 1944 |
| 2,383,126 | Hollingsworth | Aug. 21, 1945 |
| 2,412,974 | Deloraine | Dec. 24, 1946 |
| 2,415,929 | Bond | Feb. 18, 1947 |
| 2,424,577 | Mauge | July 29, 1947 |
| 2,443,198 | Sallach | June 15, 1948 |
| 2,452,547 | Chatterjea | Nov. 2, 1948 |
| 2,471,473 | Young | May 31, 1949 |
| 2,506,613 | Ransom | May 9, 1950 |
| 2,520,170 | Ransom | Aug. 29, 1950 |